Figure 1:
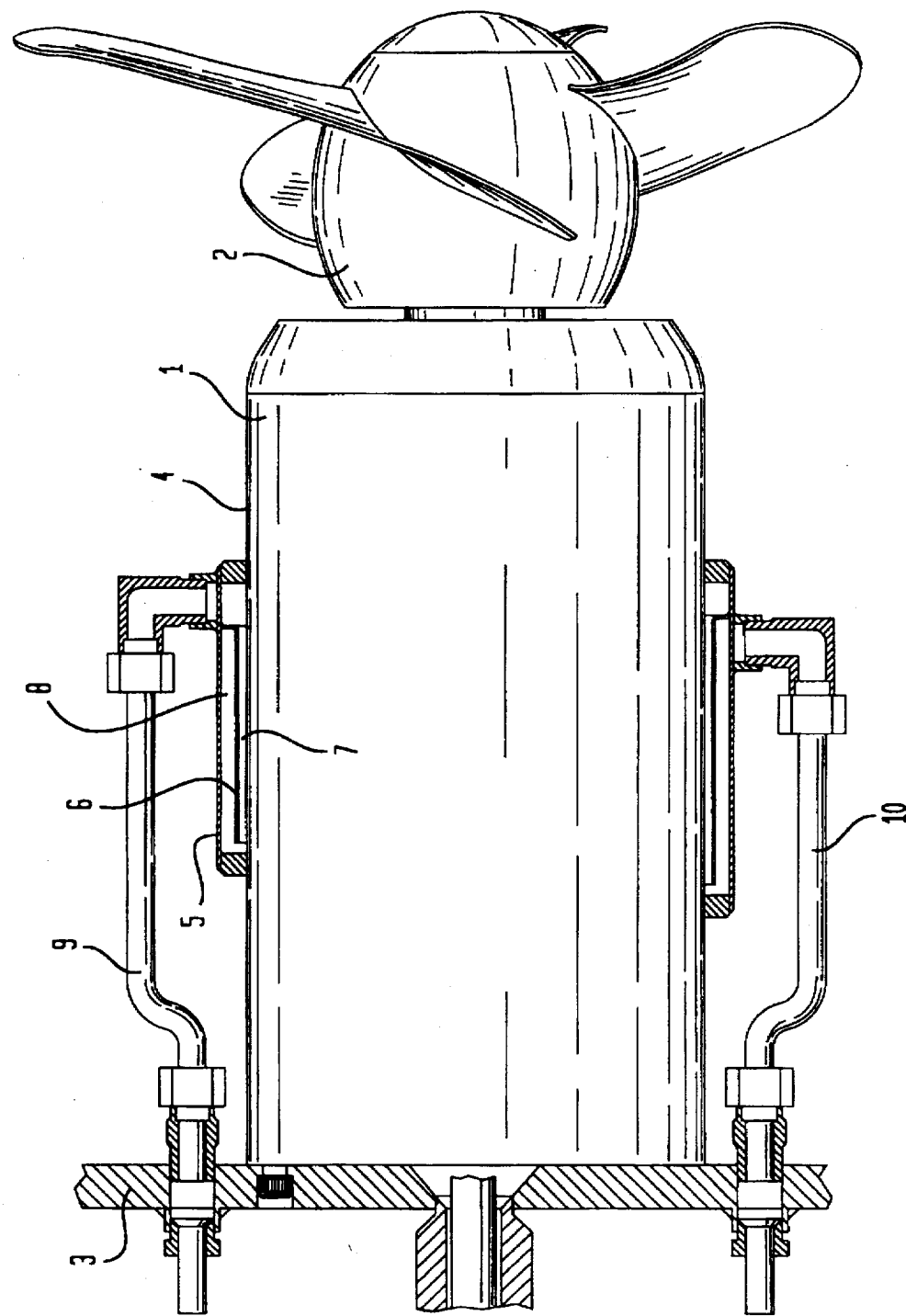

United States Patent
Mickos et al.

[11] Patent Number: 5,684,346
[45] Date of Patent: Nov. 4, 1997

[54] COOLING DEVICE

[75] Inventors: Jan Mickos, Jarfalla; Roland Narholm, Vaxholm; Per Stjerna, Huddinge; Peter Uvemo, Spanga, all of Sweden

[73] Assignee: ITT Flygt AB, Solna, Sweden

[21] Appl. No.: 739,390

[22] Filed: Oct. 29, 1996

[51] Int. Cl.[6] ..................... H02K 5/20
[52] U.S. Cl. ............... 310/58; 310/52; 310/54; 310/64
[58] Field of Search ............... 310/58, 54, 64, 310/52; 165/169, 142

[56] References Cited

U.S. PATENT DOCUMENTS

| 2,951,165 | 8/1960 | Arutunoff | 310/54 |
| 3,653,785 | 4/1972 | Dahlgren et al. | 310/54 |
| 4,516,044 | 5/1985 | Bone | 310/64 |
| 5,215,144 | 6/1993 | May et al. | 165/164 |
| 5,250,863 | 10/1993 | Brandt | 310/54 |

*Primary Examiner*—Thomas M. Dougherty
*Assistant Examiner*—B. Mullins
*Attorney, Agent, or Firm*—M. J. Lombardi

[57] ABSTRACT

The invention concerns a cooling device for an electrically driven mixer operating in hot liquids.

The motor (1) is surrounded by a cooling jacket (5) having inlet (8) and outlet (9) for cooling medium.

The jacket (5) is provided with a concentric partition wall (6) which devide the room inside the jacket into two gaps (7) and (8) respectively of different widths.

1 Claim, 1 Drawing Sheet

COOLING DEVICE

The invention concerns a cooling device for a mixer operating in liquids that are often hot and contain large amounts of solid bodies.

Mixers of this type comprise a driving unit such as an electric motor, a propeller and a driving shaft therebetween. The propeller may be provided with two or more blades and arranged to be operated at varying speeds depending on the field of use.

Mixers are used within very varying fields for keeping liquids in suspension and for homogenizing liquids in industrial processes, for sewage treatment, in agriculture etc. The mixer may have a horizontally or vertically oriented shaft or various angles therebetween. It can also be arranged movable so that the flow from the mixer may sweep over larger areas or towards certain points in the tank.

The cooling of the electric motor is obtained from the surrounding medium which demands a certain flow around the motor, said flow normally being obtained by the mixer itself. It is also a provision that the surrounding medium is cool enough. Specific cooling problems appear when the liquid is viscous and when different types of hot liquids within the process industry are treated.

One way to solve the problem when mixing viscous liquids is shown in the Swedish Patent No 502 118.

A mixing application where subject invention may be used is described in the Swedish Patent application No 9500 495-8.

The invention is described more closely below with reference to the enclosed drawing.

Here 1 stands for an electric motor having a water tight capsule and driving a mixer propeller 2. 3 stands for a cover to which the mixer is attached. 4 stands for the motor casing, 5 a cooling jacket, 6 an intermediate wall, 7 and 8 gaps and 9 and 10 inlet and outlet respectively for cooling medium.

The heat generated by the electric motor 1 will, as mentioned before, be transmitted to the surroundings in order to avoid a harmfully high temperature in the windings of the motor.

The Swedish Patent No 405 533 and U.S. Pat. No. 4,516,044 show measures which obtain a cooling by feeding cooling water which is circulated around the motor. This is normally satisfying as long as the motor is surrounded by air of reasonable temperature. If the motor is surrounded by a hot liquid however, this solution is not effective enough, at least not if normal amounts of cooling water are used.

According to the invention a cooling jacket 5 is arranged around a part of or around the entire motor 1. Said jacket being provided with a cylinder formed partition wall 6 along most of its extension. Cooling water is fed to the room 7 inside the partition wall, close to the mantle surface 4 of the motor and is carried away from the room 8 outside said partition wall, after first having flown through the inner room around the mantle surface of the motor and than the outer. According to the invention the partition wall 6 is located so that the gap 7, between said wall and the mantle surface is considerable narrower than the gap 8, between the partition wall 6 and the outer wall 5. The difference is typically two to four times, preferably three times. As the amount of cooling liquid passing the two gaps 7 and 8 is the same, the velocity of the flow will be much higher in the inner gap compared to the outer. The high velocity in the inner gap 7 means a very good heat transfer from the mantle surface 4 of the motor to the cooling medium. The lower velocity in the outer gap means a lower heat exchange and thus said gap acts as an insulating layer between the motor and the hot surrounding liquid.

If the amount of cooling liquid is increased the heat exchange will of course also increase. What is essential according to the invention is however that the two gaps have different widths meaning that the velocity in the inner gap is always higher than in the outer gap.

By help of the invention a cooling device for a submersible electric motor has been obtained which considerably adds to the possibility to cool effectively, also when the surrounding liquid is hot. The cooling will often be sufficient even with a very limited amount of cooling medium.

We claim:

1. A cooling device for an electric motor intended for driving a propeller mixer for liquids or a rotating pump impeller, said motor (1) normally being surrounded by the treated, pumped liquid, said cooling device comprising a cooling jacket (5) which concentrically surrounds a mantle surface (4) of the motor, said jacket provided with a cooling liquid inlet (9) and a cooling liquid outlet (10) for a cooling medium and an axially directed cylindric partition wall (6) which divides the jacket into two concentric gaps (7) and (8) respectively, the inner gap connected to the cooling liquid inlet (9) and having a width of at most 50% of the outer gap connected to the cooling liquid outlet (10).

* * * * *